United States Patent [19]

Smitt

[11] 4,345,324

[45] Aug. 17, 1982

[54] PROCESS AND SYSTEM FOR ERROR DETECTION IN A COMPUTER-CONTROLLED TELEPHONE EXCHANGE

[75] Inventor: Asbjørn Smitt, Vedbaek, Denmark

[73] Assignee: Christian Rovsing A/S, Denmark

[21] Appl. No.: 167,226

[22] Filed: Jul. 9, 1980

[51] Int. Cl.³ .......................... H04J 3/14; H04M 3/24
[52] U.S. Cl. ........................................ 370/14; 370/13; 179/175.2 R
[58] Field of Search ........................ 370/14, 13, 63, 16; 179/175.2 R, 175.23; 364/200 MS FILE

[56] References Cited

U.S. PATENT DOCUMENTS

| | | | |
|---|---|---|---|
| 3,223,976 | 12/1965 | Abbott et al. | 340/147 |
| 3,752,940 | 8/1973 | Santulli et al. | 179/175.2 R |
| 3,892,928 | 7/1975 | Casterline et al. | 179/175.2 R |
| 3,909,562 | 9/1975 | Lager | 370/14 |
| 3,912,871 | 10/1975 | Battocletti | 370/63 |
| 3,920,914 | 11/1975 | Regnier et al. | 370/63 |
| 3,927,267 | 12/1975 | Voyer et al. | 370/63 |
| 3,937,935 | 2/1976 | Le Pabic | 179/18 J |
| 4,037,054 | 7/1977 | Neufang | 370/13 |
| 4,048,445 | 9/1977 | Ghisler | 370/13 |
| 4,059,736 | 11/1977 | Perucca et al. | 364/200 |
| 4,064,369 | 12/1977 | Battocletti | 370/13 |
| 4,081,611 | 3/1978 | Bovo et al. | 370/13 |
| 4,213,201 | 7/1980 | Gagnier et al. | 370/13 |
| 4,224,475 | 9/1980 | Charransol et al. | 370/13 |
| 4,228,535 | 10/1980 | Workman et al. | 370/16 |

Primary Examiner—Douglas W. Olms
Attorney, Agent, or Firm—Fleit & Jacobson

[57] ABSTRACT

A method of supervising a plurality of data processing units in a redundant data processing system for controlling a telephone exchange having redundant digital switching networks, preferably of the TST type (Time-Space-Time), said processing units serving i.a. to set up and delete redundant communication channels through the switching networks. The process is original in that error detecting is provided for by comparing associated telecommunication output data from each switching network, a discrepancy in anyone of said comparisons indicating an error in the set up by the controlling units of the respective communication channel through the switching networks. This obviates microsynchronization of the units which may consequently comprise more than two units. Thus the invention provides for $n+1$ redundancies and allows a more efficient error finding since a larger number of units can execute a program in a plurality of separate program phases and the said error indicating signal of the invention is used for initiating exchange of the program phases between the units. In a preferred embodiment the exchange is of the TST type (Time-Space-Time switch) and there is provided a plurality of comparator circuits corresponding to the number of output time switches in each switching network, said comparator circuits being directly connected to the respective output time switches for comparing the time division multiplexed output data from the time switches.

8 Claims, 8 Drawing Figures

PROCESS AND SYSTEM FOR ERROR DETECTION IN A COMPUTER-CONTROLLED TELEPHONE EXCHANGE

BACKGROUND OF THE INVENTION

Digital switching of communication connections through an exchange, such as a telephone exchange, has in principle been possible for a long time, but has not been useful in practise. The reason is that digital switching networks should be controlled by data processing units in order for the networks to be fully utilized. Recent developments have made the data processing units so cheap that the digital switching technique is now expected to become extensively used in the years ahead.

As telephone exchanges become very complex the error finding and correcting means gain in importance, and the present invention therefore relates to such means.

It is known to use two redundant switching networks which are controlled by two redundant data processing units. One of the processing units is active and controls the two switching networks, while the other is idle and ready to take over the control in case of errors in the active units. The units work in parallel which permits comparisons to be made between the output signals on the main busses of the units for purposes of error finding. This error finding technique requires, however, so-called microsynchronization between the processing units, which is partly a cumbersome technique and prevents the use of more than two units for controlling the switching networks with a view to increasing the capacity of the telephone exchange.

Thus the invention particularly concerns digital telephone exchanges, which means that the switching network of the exchange is a digital network that is controlled by data processing units, the subscriber circuits being based on either digital or analog techniques. In the latter case analog/digital conversion is used between the subscriber lines and the exchange. The description of the invention may therefore be restricted to data processing unit controlled switching circuits and associated PIMs (Pulse Code Modulated Interface Modules).

SUMMARY OF THE INVENTION

According to the invention error detection is effected by comparing data from the outputs of each of the redundant switching networks. It is thus possible to make comparisons between data occurring at the same time without the above-mentioned microsynchronization being required, which appears from a later, brief explanation of the operation of a digital switching network. The invention significantly simplifies the detection of errors in the set up by the data processing units of communication connections through the switching networks, while errors in the switching networks being found in a manner known per se by parity checks of telecommunication data.

In principle, said comparison may be made between output data stemming from random input data printed externally, but as the telecommunication data which are redundantly fed through the exchange may in principle be considered as random data, the latter data are used in the comparison in the comparator circuits according to the invention.

The microsynchronization mentioned above is superfluous in the method of the invention, and it is consequently feasible to use three or many processing units sharing the task of setting up the redundant digital switching networks. This involves n+1 redundancies (redundancies of n processing units merely by means of a single, additional processing unit) and in particular allows a more effective error finding. This is done according to the invention in that the processing units execute separate program phases and in that an error indicating signal produced in response to said comparison initiates an error finding procedure comprising one or more exchanges of the program phases so that at each exchange the program phases are executed in a new combination of processing units.

This technique permits the program phases to be executed by different hardware, and the hardware error can therefore be localized very rapidly.

In one aspect of the invention there is provided a system which comprises comparator circuits arranged to compare sets of time division multiplexed telecommunication data from associated sets of outputs from each of the redundant digital switching networks and to produce an error indication signal if anyone of associated sets of telecommunication data, which are redundantly fed through the exchange, do not match.

In another embodiment the system comprises at least three data processing units arranged to execute a program as a plurality of separate program phases, wherein said program phases are exchangable among the processing units, depending upon said error indicating signal.

New calls received by the exchange are stored as a queue of requests and according to another aspect of the invention a buffer store is provided for each switching network as well as means for relocating said queues to thereby provide for a setting up, as simultaneous as possible, of a redundant connection through the redundant switching network. During operation there may be a slight time delay between the setting up of the redundant connections through the networks, and the comparator circuits are therefore dependent upon a delayed set up bit which is produced with a predetermined, maximum permissible time delay with respect to a nominal set up time.

A preferred embodiment comprises two switching networks of the Time-Space-Time type and comparator circuits for producing error signals, each of said comparator circuits being connected directly to two output time switches, one from each switching network. Since the comparator circuits are directly connected with respective output time switches the comparison is performed between time division multiplexed output data so as to effectively utilize the comparator circuits. The location of the error may be pointed out based on storing of the time slot number in response of the error indication signal. Each TST network has preferably a control memory in the form of a dual ported random access memory having a plurality of addressable locations corresponding to the number of time slots, the information for each location being input from the processing units for the control of both the space switch, the input time switch and the output time switch, and each of said locations containing a set-up bit as well as a delayed set-up bit. The comparator circuit being responsive to said set-up bit and delayed set-up bit thereby eliminating false errors due to a time difference in setting up of the two TST networks.

Since the invention, as mentioned, permits the use of three or more processing units for controlling the two switching networks separately, the error finding may be made more effective by arranging the processing units to execute a program in the form of a plurality of program phases distributed among the processing units, the said error finding means being responsive to the error indicating signal for initiating an error finding procedure comprising one or more exchanges of the program phases so that at each exchange the program phases are executed in a new combination of processing units.

DETAILED DESCRIPTION

Before the preferred embodiment will be described, the operation of a known TST switching network, shown in FIG. 1, will be explained.

The shown network has three incoming and three outgoing feed paths each arranged for 32 time slots (24 time slots are normally used in the United States). In practice the number of time slots is larger, e.g. 256 or 512, obtained through multiplexing and series/parallel conversion, but this does not affect the principles of the operation of the switching network.

For the purpose of explaining the operation of the switching network, it is assumed, in accordance with the figure, that it is desired to establish a connection between input X, e.g. a subscriber, accorded incoming time slot No. 2 in incoming feed path No. 1 and output Y accorded outgoing time slot No. 31 in outgoing feed path No. 3.

This requires a spare path to be found in the network, which implies searching for an interval time slot which is unoccupied on the incoming side of X as well as on the outgoing side of Y of the space switch. Searching is performed as a logic operation by means of a processing unit. When the first free time slot, e.g. No. 7, has been found, the control system transmits this number and the desired addresses (2, 31 and 1) to the control memories CM-X, CM-Y and CM-C. The addresses are stored in cell No. 7 of said memories.

The PCM word of X is input in cell No. 2 of SM-X in the incoming time slot No. 2. It is stored there until internal time slot No. 7 arrives. As the incoming time slot numbers probable do not coincide with the internal time slot numbers, the period of storing may range from 0 to 31 time slots. In internal time slot No. 7 the address is delivered to cell No. 2 from CM-X, and the PCM word is read out to the space switch. At the same time the address from CM-C is delivered to the junction pointed out, and the PCM word is transmitted to the desired SM-Y where it is stored in cell No. 31 by the aid of CM-Y. Finally, the PCM-word is transmitted to Y when the outgoing time slot No. 31 arrives.

This sequence, which is repeated once for each frame, forms a path from X to Y. However, there is still no transmission from Y to X. This may be provided for by two methods, which are only outlined below because said transmission is not essential to the understanding of the invention. The other path is either established entirely independently of the first one or the two paths are established in coordination. The first method possibly provides the most flexible system, whereas the second one allows savings in material owing to the symmetry of the switching network. In the second method searching for the two paths is performed in one operation, while the first method involves two separate searches.

Figure 2:
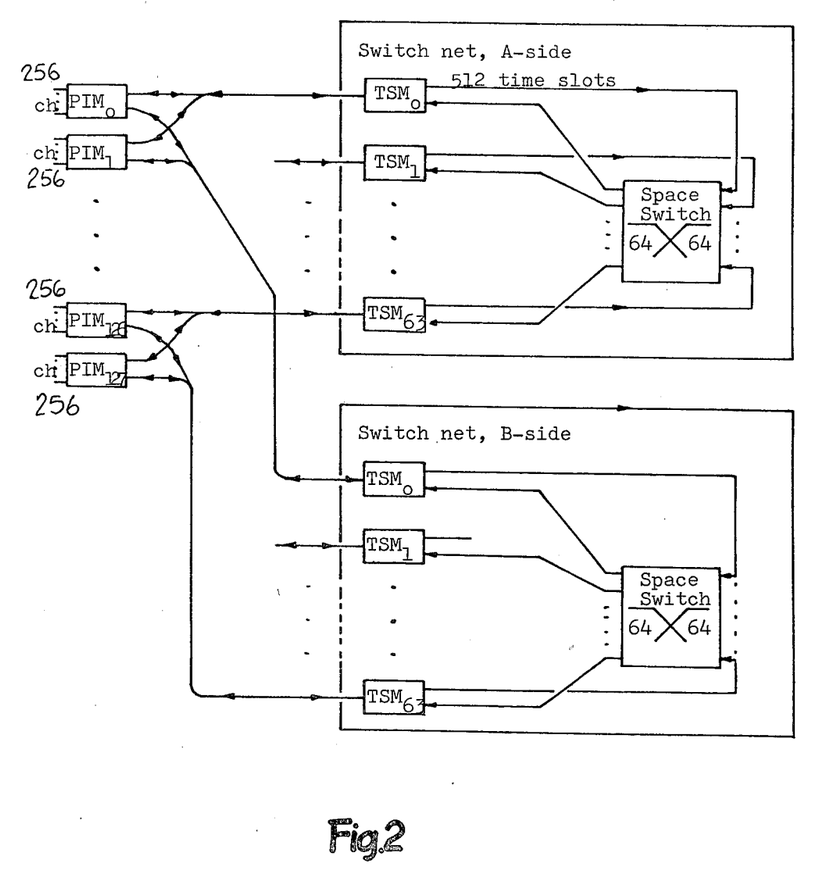
FIG. 2 schematically shows an aspect of the system of the invention comprising two active switching networks.
Figure 3:
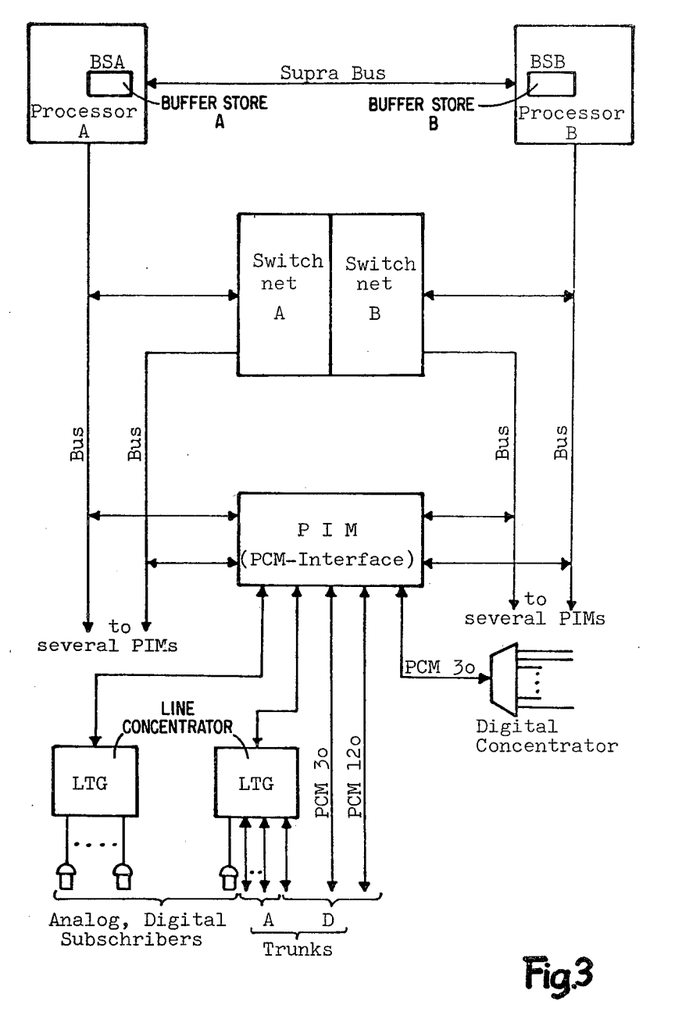
FIG. 3 schematically shows a complete telephone system arranged according to the principles of the invention.

FIGS. 2 and 3 schematically show a diagram of an embodiment of the system of the invention. The details and operation of the comparison technique of the invention will be described in connection with FIGS. 4, 5 and 6.

Figure 1:
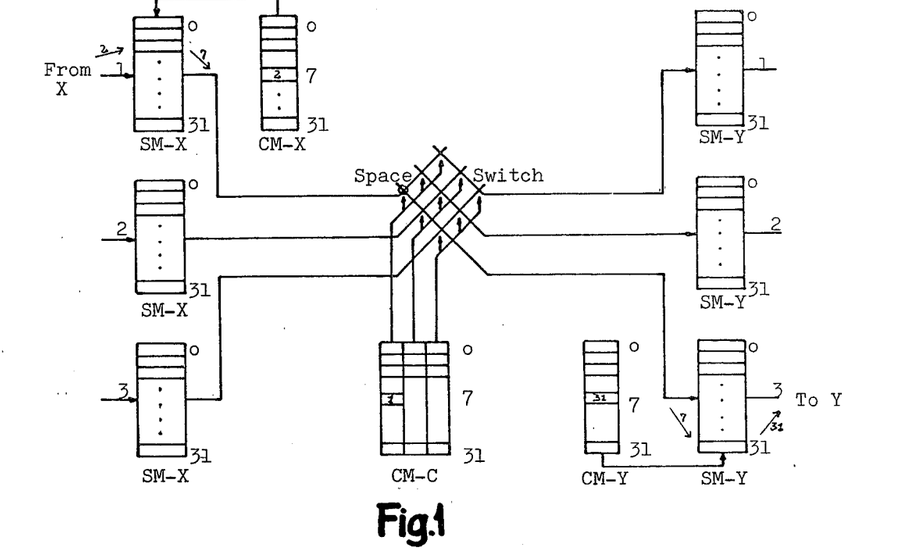
FIG. 1 shows a diagram of a known TST (Time-Space-Time) network and serves to explain the art which is related to the invention.

FIG. 2 shows two switching networks A and B, which each corresponds in principle to the switching network shown in FIG. 1. Each TSM (Time-Switch-Module) contains a 512×512 time switch in each direction and corresponds to a combination of sixteen time switches SM-X and SM-Y shown in FIG. 1. The embodiment shown comprises a total of 64 TSMs so that the maximum switching capacity is 64×512=32,768 channels. The switching networks A and B are both connected to a pulse code modulated interface modul PIM, 128 PIMs being provided in the shown embodiment, each serving 256 channels. Accordingly two PIMs are connected to one TSM in each switching network so that one PIM handles the even numbered time slot while the other PIM handles the uneven numbered time slot (512 time slots in either direction).

According to the invention both the switching network A and the switching network B are active and redundantly controlled by a plurality of processing units so that a connection is set up, independently of each other, through the A network and B network, respectively.

According to the invention a comparator circuit, as will be described later, is provided in each PIM or directly attached thereto, said comparator circuit being arranged to compare output data for the A network and the B network, respectively; the data to be compared must match if the connections are established properly in the two switching networks A and B. The switching networks A and B are separately controlled, and said redundant connections are therefore usually set up in physically different paths in the two circuits; said comparison discloses any errors in the set up of the signal paths through the switching networks A and B.

When in one of the 512 time slots a pulse code modulated data word (of e.g. 8 bits) arrives to a PIM said data word and a parity bit produced by the PIM will be transmitted to the A network as well as to the B network. At the telephone call the controlling processing units were advised where to transmit said data word, i.e. channel number and PIM number of the receiver are specified. If the connection is properly set up through the switching networks, the receiving PIM will receive said data word from both the A network and the B network, and reception will, with reference to the operation described in connection with FIG. 1, take place simultaneously so that according to the invention said two data words may be directly compared without an additional synchronization being required. Since the PIM data words are approximately completely random, said comparison technique will with extremely great certainty immediately disclose any error in the setting up of transmission paths through the switching networks A and B.

FIG. 3 shows a more complete diagram of a telephone system of the invention. For clarity only a single PIM is shown, but it will be appreciated that both switching networks A and B are connected to a larger number of PIMs by means of the bus lines shown in the figure. As shown in FIG. 3 each PIM may be connected to line concentrators LTG which in turn are connected to analog or digital subscribers, and PIM may be connected to line trunks and digital concentrators. The latter possibilities of connection to PIM do not constitute any part of the invention and are therefore not explained in detail.

The embodiment shown in FIG. 3 comprises two central processing units A and B which are arranged to separately control the shown switching networks A and B. Of course, the control depends upon external calls. A predetermined number of the time slots contain control information in a known manner, said information being transmitted to the central processing unit A and to the central processing unit B by means of PIM. In both central processing units is established a queue of calls in a buffer store, BSA and BSB, respectively. According to the invention the shown supra bus is i.a. used for relocating the buffer stores to thereby make the treatment of a call as simultaneous as possible in the central processing unit A and the central processing unit B. This minimizes the time delay between the setting up by the central processing unit A and the central processing unit B of a new connection through the switching network A and B, respectively.

Figure 4:
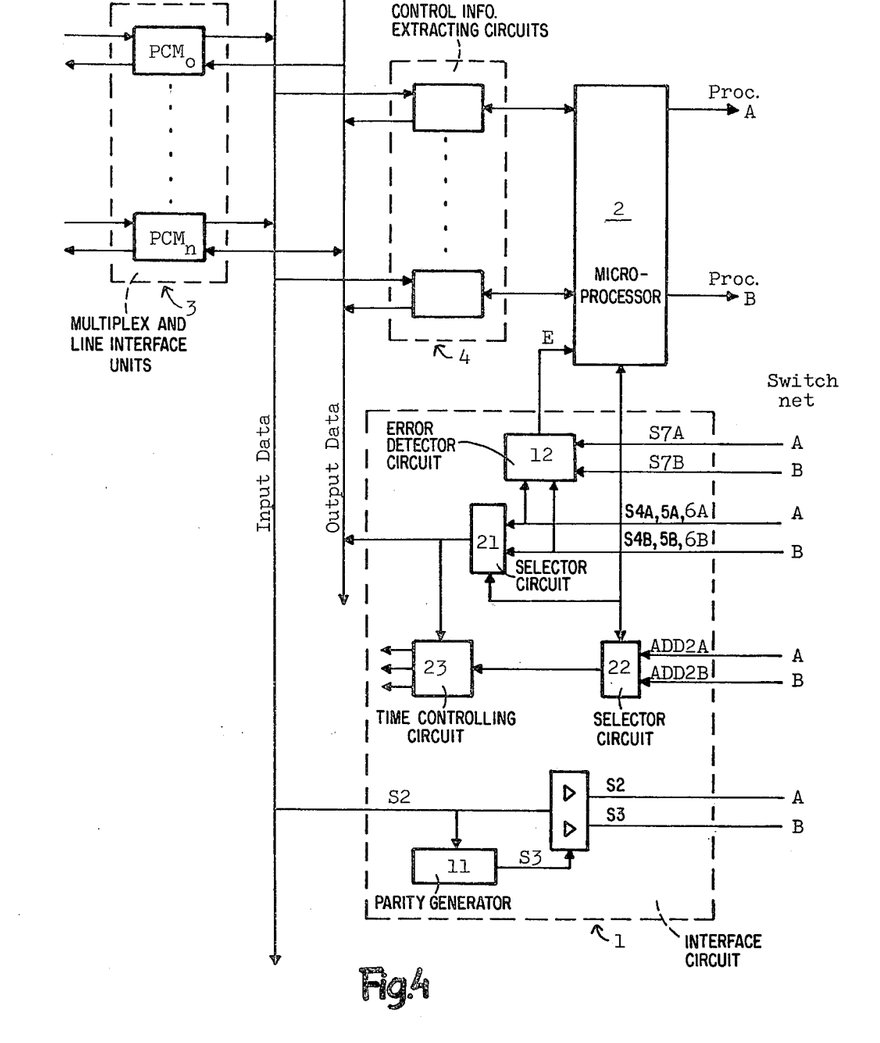
FIG. 4 shows details according to the invention of a pulse code modulated interface circuit.
Figure 5:
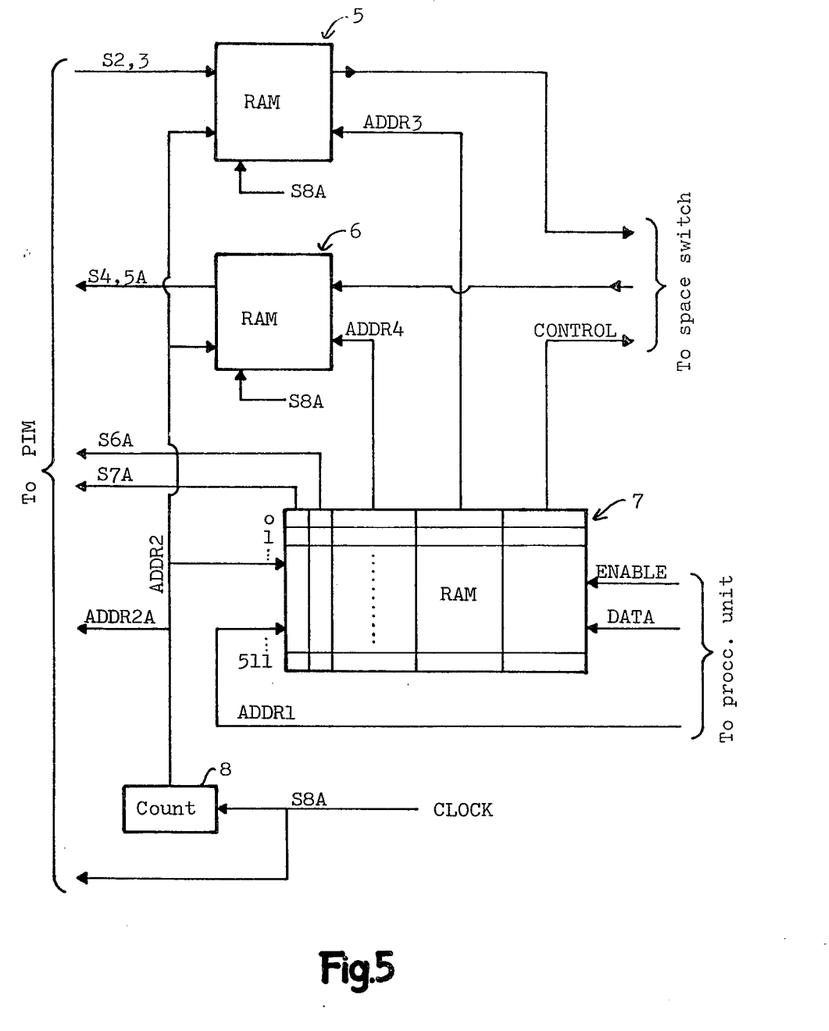
FIG. 5 shows details according to the invention of a TST network.
Figure 6:
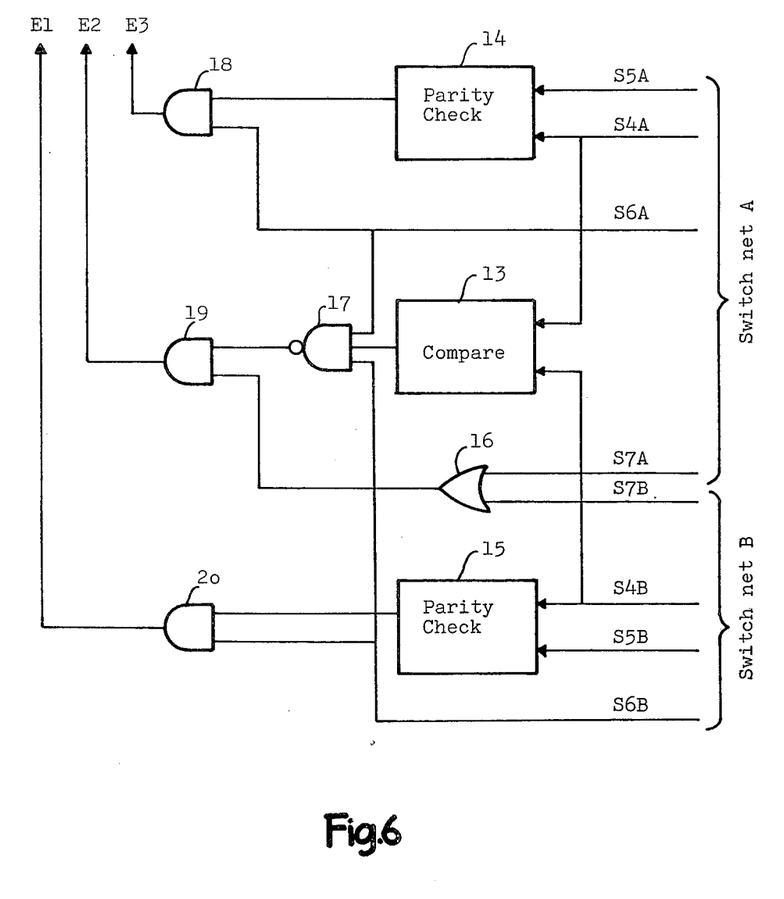
FIG. 6 shows a preferred circuit diagram of the comparator circuit of the invention as shown in FIG. 4.

Referring to FIGS. 4, 5 and 6 an embodiment of the system of the invention will be described in detail. The circuit shown in FIG. 4 corresponds to a PIM from FIG. 2, such as $PIM_o$. FIG. 4 comprises an interface circuit 1 that includes the comparator means of the invention and which will be described later. The circuit also includes a microprocessor 2 as well as multiplex and line interface units $PCM_o$-$PCM_n$ for receiving and transmitting the data exchanged. The last mentioned units (3 in the drawing) as well as the units 4 perform some operations which are not directly related to the invention, but it may e.g. be pointed out that the latter circuits 4 i.a. extract and transmit information in predetermined ones of the time slots which contain control information for the data processing units, such as information about calls.

The interface circuit 1 of FIG. 4 receives a data word of 8 bits (S2) for each time slot, and a parity bit (S3) is produced by means of a parity generator 11. The signals S2+S3 are passed to a TSM (time switch module) in both the switching network A and the switching network B, as can also be seen in FIG. 2.

FIG. 5 schematically shows details of one of the switching networks, the signals illustrated in the figure being related to the switching network A. For clarity, the space switch is omitted in FIG. 5 because the switch may be of any type.

The circuit shown in FIG. 5 comprises two dual ported random access memories (RAM) 5 and 6, each including 512×9 bits, and comprises a dual ported random access memory (512×26 bits) 7 as well as a 9-bit counter 8. The structure of the circuit of FIG. 5 partially corresponds to that of FIG. 1, RAM 5 corresponding to SM-X and RAM 6 to SM-Y. The memories CM-X, CM-Y and CM-C of FIG. 1 are gathered in RAM 7 in the preferred embodiment; according to the invention RAM 7 has also a bit position for a set-up bit S6A and a delayed set-up bit S7A for each of the 512 store locations. RAM 7 is controlled by the respective processing unit or units which are capable of inputting DATA as a line (26 bits) in RAM 7 in response to an address ADDR 1 and ENABLE bit.

The mode of operation of the circuit shown in FIG. 5 can also be compared to the explanation provided in connection with FIG. 1, the PCM word S2 and the associated parity bit S3 (see FIG. 4) being input in RAM 5 with an address ADDR 2 produced by the counter 8. Input in RAM 5 is successive as was explained in connection with FIG. 1, while output to the space switch is random in response to an address ADDR 3 which by the respective processing unit is placed in RAM 7 in the address pointed out by ADDR 2. RAM 7 applies six control bits CONTROL to the space switch, thereby to set up said switch so that the PCM word and the associated parity bit are received by RAM 6 where it is stored in an address ADDR 4 received from RAM 7. Output of the data word with the associated parity bit is responsive to the address ADDR 2, the output signal being indicated by S4A+S5A to show that said data originate from the switching network A, and that due to an error said data may differ from those input. Accordingly, RAM 7 provides for simultaneous output of the addresses ADDR 3 and ADDR 4, the control words CONTROL and of S6A and S7A for each address ADDR 2.

Referring to FIG. 4, assuming that redundant paths have been set up through the two switching networks, the interface circuit 1 receives a data signal S4A, the associated parity bit S5A, and the set-up bit S6A from the switching network A. The interface circuit 1 receives corresponding signals S4B+S5B+S6B from the switching network B. Said signals and the delayed set-up bit S7A and S7B are fed to an error detecting circuit 12, which is shown in greater detail in FIG. 6 and is arranged to apply error signals to the microprocessor 2 via three lines.

Referring to FIG. 6, the error detecting circuit 12 (FIG. 4) comprises an 8-bit-comparator 13, parity check circuits 14, 15, and OR gate 16, a NAND gate 17 as well as AND gates 18, 19, 20 which are arranged to produce error output signals E1, E2, and E3, respectively. The parity check circuit 14 receives the data signal S4A and the associated parity bit S5A, and is arranged to produce an error signal on the output if a parity error is detected. This error signal is then passed on to the microprocessor 2 (FIG. 4) via the AND gate 18 if set-up bit S6A is logical "1". As previously described S6A is provided by the TSM control memory (7, FIG. 5) set up by the processing unit A at the same time said unit sets up a path in the switching network A. Thus, the error signal E3 indicates whether a hardware error has occurred in the switching network A.

Similarly, an error signal E3 indicating hardware errors in the switching network B is produced by the parity check circuit 15 and the AND gate 20. It is noted that the error signals E1 or E3 are only provided if a hardware error occurs in the signal path through the respective ones of the redundant switching networks, and it cannot be ascertained by means of these signal errors whether the processing units have set up a wrong path through the switching networks (referring to FIG. 1 it may have happened that the PCM word has been transferred to cell No. 30 in Sm-Y instead of in cell No. 31 as desired). The main object of the invention is to detect errors of the latter type.

According to the invention the error detecting circuit 12 comprises said 8-bit-comparator 13 that receives the data signals S4A and S4B from the switching networks A and B, respectively. If the two received data words are identical a signal logical "1" is produced on the output of the comparator, said output being connected to one input terminal of the NAND gate 17. The two other input terminals of the NAND gate 17 receive the signals S6A and S6B, respectively. It will then be understood that a logical "1" is produced on the output of the NAND gate 17 if the connections are set up through both switching networks, simultaneously with S4A being different from S4B. As the 8-bit-data words fed through the exchange may be considered as being random, any discrepancy between the signals S4A and S4B will indicate that the data path through at least one of the switching networks is incorrectly set up.

Figure 7:
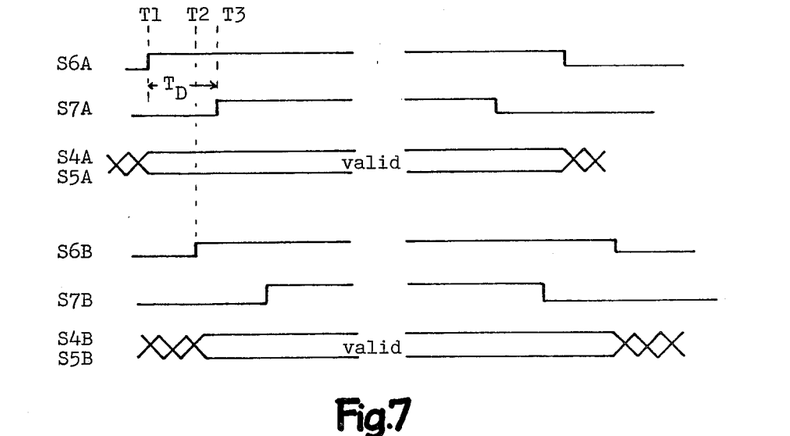
FIG. 7 shows an example of the course of signals as a function of the time relating to FIGS. 4, 5 and 6.

When a new connection is to be established through the telephone exchange, the connections through the redundant switching networks will invariably be set up with a slight time delay though it is attempted to minimize said time delay by means of the buffer registers BSA and BSB (FIG. 3). In order for said time delay not to cause a false error signal E2, the output signal from the NAND gate 17 is applied to one input terminal of the AND gate 19 which has another input terminal connected to the output of the OR gate 16. The OR gate 16 has two input terminals that receives the signal S7A and S7B, respectively, which is the delayed set-up bit produced by the respective TSM control memories set up by the processing units in accordance with a maximum permissible time delay in the setting up of a new connection. FIG. 7 shows an example of the course as regards time of the signals with relation to FIG. 6 (it being observed that the time diagram of FIG. 7 only comprises the sequence for a certain time slot in the 256 time slot multiplex frame of a PIM during several frames).

Referring to FIG. 7, the signal S6A indicates that the connection through the switching network A is set up at the time T1, and the signal S6B indicates that the connection through the switching network is set up at the time T2. The time $T_D$ indicates the maximum permissible set-up time for the switching networks, and in accordance with the circuit of FIG. 6 it will be seen that the AND gate 19 is enabled at the time T3.

As appears from FIG. 4, the error signals E1, E2 and E3 are applied to the microprocessor 2 which in response to the error signals controls two selector circuits 21 and 22. It is determined by means of the selector circuit 21 whether the data word from the switching network A or B is to be transferred as output data, and further a single bit "valid data" is transferred to a time controlling circuit 23. The time controlling circuit receives a 10-bit-word from the selector circuit 22 by means of which it is determined whether a clock signal (1 bit) and a time slot number (9 bits) are transmitted from switching network A or from the switching network B. The output signals from the time controlling circuit 23 controls the line-interface circuits in synchronism with the selected switching network in a manner which is known per se and will accordingly not be described in detail.

If the microprocessor 2 receives the error indicating signal E2 this will immediately cause storing of the signals ADDR 2 (A or B) fed to the selector circuit 22 in auxiliary registers so that by reading the auxiliary registers the microprocessor 2 will know the address of the faulty path through the switching networks.

In the foregoing description of the embodiment it has been explained how an error in the setting up of the redundant paths through the switching networks A and B can be detected very efficiently, without this requiring the microsynchronization mentioned in the beginning between the two processing units. The detected error may be localized in a manner known per se, but since, as mentioned, no microsynchronization is called for between the processing units in the system of the invention, said system may comprise many processing units, resulting in a new method for localization of the error, which is illustrated by the diagram shown in FIG. 8.

Figure 8:
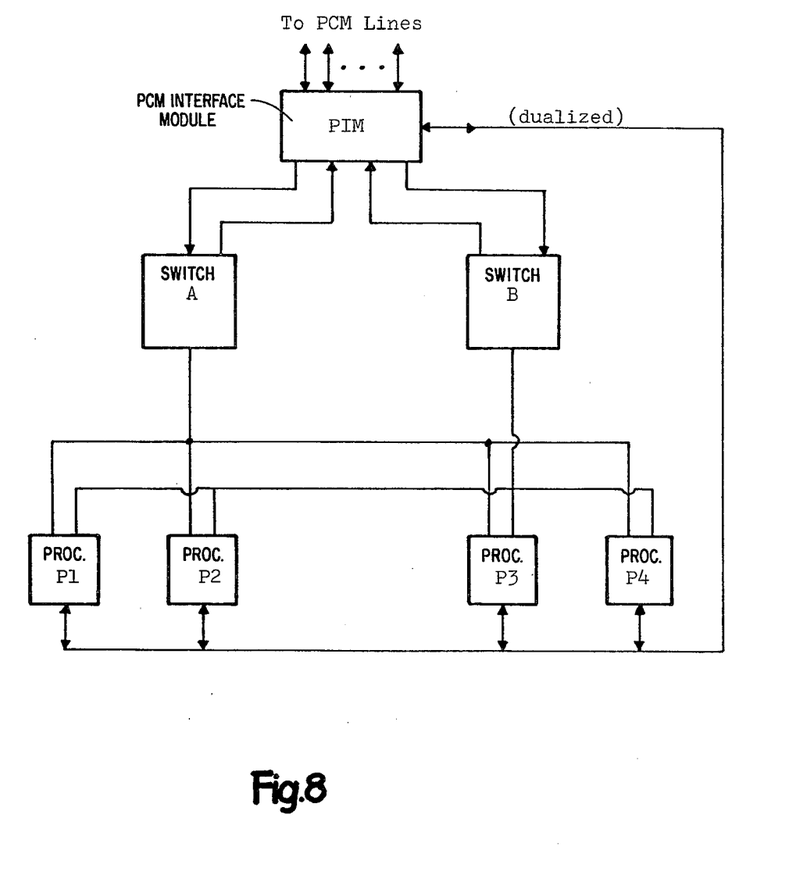
FIG. 8 schematically shows a preferred embodiment of a system of the invention, comprising four (more than two) processing units for the control of the switching networks.

For clarity, FIG. 8 shows an embodiment with only four processing units P1, P2, P3 and P4 which are arranged to share among themselves the redundant setting up of communication channels through the switching networks A and B. For clarity, only a single PIM is shown which is connected to the redundant switching networks and to a dualized data bus common to the processing units.

Referring to the table just above, it is now assumed that the setting up of the switching network A in a first run I is provided by means of three separate program phases F1A, F2A and F3A which are executed on the processing units P1, P2, and P3, respectively. Similarly, it is assumed that the switching network B is set up by separate program phases identical with the above-mentioned program phases, but are e.g. executed as shown in FIG. 8 so that the program phases F1B, F2B and F3B are executed in the processing units P2, P3 and P4, respectively. If PIM signals that there is an error E2 in the setting up of the switching networks A or B, this will according to the system of the invention give rise to a control signal initiating exchange of the program phases so that e.g. a new run (II) is executed which is shown in the table. If the error has disappeared it can now be established that the error with great probability originates from the processing unit No. 2, because said unit is the only processing unit which is not involved in any processing of program phases. It will then be appreciated that cyclical exchanges and isolation of a processing unit from the processing of the program provide for localization of the error. This technique becomes even more efficient when the number of processing units and program phases are increased. Further, it will be realized that n+1 redundancies are achieved, corresponding to the achievement of redundant operation of n processing units by using n+1 processing units, which results in hardware savings.

The advantages mentioned in connection with FIGS. 8 and the table are very important because systems are now available on the market which consist of a large number of processing units with very rapid mutually communication connections.

In the drawings and the specification there has been set forth a preferred embodiment of the invention and, although specific terms are employed, they are used in a generic and descriptive sense and not for purposes of limitation, the scope of the invention being defined in the claims.

I claim:

1. A method of supervising a plurality of data processing units in a redundant data processing system for controlling a telephone exchange having redundant digital switching networks, said processing units serving to set up and delete redundant communication channels through the switching networks, said method comprising the steps: of separately controlling the switching networks by the said processing units; and comparing time division multiplexed telecommunication data from associated sets of outlets from each of the redundant digital switching networks, a discrepancy in any one of said comparisons indicating an error in the set up by the controlling units of the respective communication channel through the switching networks.

2. A method of supervising a plurality of data processing units in a redundant data processing system for controlling a telephone exchange having redundant digital switching networks, said processing units serving to set up and delete redundant communication channels through the switching networks, wherein said switching networks are separately controlled by at least three processing units which are arranged to execute a program in the form of a plurality of program phases distributed among the processing units, and wherein comparisons are made between time division multiplexed telecommunication data from associated sets of outlets from each of the redundant digital switching networks, a discrepancy in any one of said comparisons initiating an error finding procedure comprising at least one exchange of the program phases so that, at each exchange, the program phases are executed in a new combination of processing units.

3. A supervision system for a plurality of data processing units in a redundant data processing system for controlling a telephone exchange having redundant digital switching networks, said processing units serving to set up and delete redundant communication channels through the switching networks, said system comprising detection means for detecting errors in the processing, said detection means comprising comparator circuits arranged to compare sets of time division multiplexed telecommunication data from associated sets of outputs from each of the redundant digital switching networks and to produce an error indication signal if any one of associated sets of telecommunication data, which are redundantly fed through the exchange, do not match.

4. A system according to claim 3, comprising at least three data processing units arranged to execute a program as a plurality of separate program phases, wherein said program phases are exchangable among the processing units, depending upon the error indicating signal.

5. A system according to claim 3, comprising a plurality of buffer stores corresponding to the number of switching networks, said buffer stores serving to temporarily store a queue of requests for the setting up of respective communications connections through the exchange, said processing units being arranged to relocate the requests to thereby provide for setting up, as simultaneously as possible, any redundant connection through said redundant switching networks, each of said comparator circuits being responsive to a delayed set-up bit representative of the maximum permissible time delay between the setting up of said redundant connection.

6. A supervision system for a plurality of data processing units in a redundant data processing system for controlling a telephone exchange having redundant TST (Time-Space-Time) switching networks, each comprising a space switch connected to a plurality of respective input and output time switches, said processing units serving to set up and delete redundant communication channels through said two switching networks, said system comprising detecting means for detecting and finding errors in the processing units, the detecting means comprising a comparator circuit for each associated pair of output time switches forming said two switching networks, each said comparator circuit being connected directly to the associated output time switches for comparing time division multiplexed telecommunication data from said time switches, each said comparator circuit being arranged to produce an error indication signal for pointing out error-containing locations in the respective output time switches.

7. A system according to claim 6, wherein each TST switching network has a control memory in the form of a dual ported random access memory having a plurality of addressable locations corresponding to the number of time slots, the information for each location being input from the processing units for the control of both the space switch, the input time switch and the output time switch, and each of said locations containing a set-up bit as well as a delayed set-up bit, said comparator circuit being responsive to said set-up bit and delayed set-up bit.

8. A system according to claim 6, wherein said switching networks are separately controlled by at least three processing units which are arranged to execute a program in the form of a plurality of program phases distributed among the processing units, said detecting means further comprising initiating means responsive to the error indication signal for initiating an error finding procedure comprising one or more exchanges of the program phases so that, at each exchange, the program phases are executed in a new combination of processing units.

* * * * *